(12) United States Patent
Aggarwal

(10) Patent No.: US 8,352,458 B2
(45) Date of Patent: Jan. 8, 2013

(54) TECHNIQUES FOR TRANSFORMING AND LOADING DATA INTO A FACT TABLE IN A DATA WAREHOUSE

(75) Inventor: Nitin Aggarwal, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 533 days.

(21) Appl. No.: 12/116,693

(22) Filed: May 7, 2008

(65) Prior Publication Data

US 2009/0281985 A1 Nov. 12, 2009

(51) Int. Cl.
*G06F 17/30* (2006.01)
(52) U.S. Cl. .......................................... 707/713
(58) Field of Classification Search .................. 707/1–3, 707/100–102, 616; 715/523, 248
See application file for complete search history.

(56) References Cited

U.S. PATENT DOCUMENTS

| | | | | |
|---|---|---|---|---|
| 6,161,103 A * | 12/2000 | Rauer et al. | | 1/1 |
| 6,189,004 B1 * | 2/2001 | Rassen et al. | | 1/1 |
| 6,212,524 B1 * | 4/2001 | Weissman et al. | | 707/600 |
| 6,374,235 B1 * | 4/2002 | Chen et al. | | 1/1 |
| 6,374,263 B1 * | 4/2002 | Bunger et al. | | 1/1 |
| 6,397,204 B1 * | 5/2002 | Liu et al. | | 1/1 |
| 6,446,063 B1 * | 9/2002 | Chen et al. | | 1/1 |
| 6,782,350 B1 * | 8/2004 | Burnley et al. | | 702/186 |
| 7,174,534 B2 * | 2/2007 | Chong et al. | | 717/105 |
| 7,181,450 B2 * | 2/2007 | Malloy et al. | | 1/1 |
| 7,188,170 B1 * | 3/2007 | Burnley et al. | | 709/224 |
| 7,194,449 B2 * | 3/2007 | Miao | | 1/1 |
| 7,206,784 B2 * | 4/2007 | Gu et al. | | 1/1 |
| 7,222,123 B2 * | 5/2007 | Gu et al. | | 707/616 |
| 7,401,321 B2 * | 7/2008 | Sit et al. | | 717/125 |
| 7,426,520 B2 * | 9/2008 | Gorelik et al. | | 1/1 |
| 7,461,076 B1 * | 12/2008 | Weissman et al. | | 1/1 |
| 7,546,312 B1 * | 6/2009 | Xu et al. | | 1/1 |
| 7,574,652 B2 * | 8/2009 | Lennon et al. | | 715/248 |

(Continued)

OTHER PUBLICATIONS

Lewis, J., "Hidden Benefits of 10g," DBAzine.com, Oct. 2004, Last Modified Apr. 18, 2005, 6 pages. Downloaded on Apr. 3, 2009 from http://www/dbazine.com/olc/olc-articles/jlewis23.

(Continued)

*Primary Examiner* — Sheree Brown
(74) *Attorney, Agent, or Firm* — Kilpatrick Townsend & Stockton LLP

(57) ABSTRACT

Techniques for transforming records prior to loading the records into a data warehouse in an efficient manner. In one embodiment, instead of using lookup transformations, a database operation such as an outer join operation is used to transform records stored in a fact staging table to add foreign keys to the records corresponding to the dimension tables that are associated with a fact table in a data warehouse to which the records are to be loaded. Since the outer join operation is memory intensive, a determination is made as to which dimension tables from the multiple dimension tables associated with the fact table are suitable, from a performance perspective, for the outer join operation. Only those suitable dimension tables are outer joined to the fact staging table to add the foreign keys for the outer joined dimension tables to the fact staging table records. Lookup transformations may be used to add foreign keys to the fact staging table records for the non-suitable dimension tables. The transformed fact records with the foreign keys may then be loaded into the fact table in the data warehouse.

18 Claims, 3 Drawing Sheets

U.S. PATENT DOCUMENTS

| | | | |
|---|---|---|---|
| 7,739,224 B1* | 6/2010 | Weissman et al. | 707/794 |
| 2002/0144233 A1* | 10/2002 | Chong et al. | 717/105 |
| 2004/0015783 A1* | 1/2004 | Lennon et al. | 715/523 |
| 2004/0122844 A1* | 6/2004 | Malloy et al. | 707/102 |
| 2004/0205727 A1* | 10/2004 | Sit et al. | 717/125 |
| 2004/0243550 A1* | 12/2004 | Gu et al. | 707/3 |
| 2004/0243589 A1* | 12/2004 | Gu et al. | 707/100 |
| 2004/0243590 A1* | 12/2004 | Gu et al. | 707/100 |
| 2004/0243591 A1* | 12/2004 | Gu et al. | 707/100 |
| 2005/0055369 A1* | 3/2005 | Gorelik et al. | 707/102 |
| 2005/0065939 A1* | 3/2005 | Miao | 707/100 |
| 2007/0061347 A1* | 3/2007 | Burnley et al. | 707/100 |
| 2007/0061450 A1* | 3/2007 | Burnley et al. | 709/224 |
| 2008/0140696 A1* | 6/2008 | Mathuria | 707/102 |
| 2009/0271345 A1* | 10/2009 | Rich et al. | 706/46 |
| 2009/0276449 A1* | 11/2009 | Syed et al. | 707/101 |

OTHER PUBLICATIONS

Rleishman, "World's Fastest Scalable Join," orafaq.com, Mar. 2, 2007, 6 pages. Downloaded on Apr. 3, 2009 from http://www.orafaq.com/node/1446.

Wikipedia, "Join (SQL)," Wikipedia.org, 10 pages. Downloaded on Apr. 3, 2009 from hhttp://en.wikipedia.org/wiki/join_(SQL).

Infogoal, "SQL Outer Join," Infogoal.com, 3 pages. Downloaded on Apr. 23, 2008 from http://infogoal.com/sql/sql-outer-join.htm.

* cited by examiner

TECHNIQUES FOR TRANSFORMING AND LOADING DATA INTO A FACT TABLE IN A DATA WAREHOUSE

BACKGROUND OF THE INVENTION

The present application relates to data warehouses, and more particularly to techniques for transforming and loading information into a data warehouse in an efficient manner.

ETL (data Extraction, Transformation, and Loading) processes are commonly used to extract data from data sources, perform transformations on the extracted data, and to load the transformed data into one or more target data stores. Various ETL tools are provided for performing ETL processes including ETL tools from Informatica. The data sources may be databases (such as Oracle databases), applications, flat files, and the like. The target data store may include databases, flat files, and the like. In a typical ETL process, desired data is identified from the data sources and extracted from one or more data sources. The extracted data is then transformed and then the transformed data is loaded into the target data store. Data transforms are often the most complex and, in terms of processing time, the most costly part of an ETL process. The transformations can range from simple data conversions to extremely complex transformations.

ETL processes are commonly used where the data sources are online transaction processing (OLTP) systems and the target data store is a data warehouse. For example, the target data store may be a sales analysis data warehouse and a data source might be an order entry system that records all of the current order activities. A data warehouse is a data store that is designed for query and analysis rather than for transaction processing. A data warehouse usually stores historical data derived from transaction data, it can also include data from other sources. Data warehouses are designed to accommodate ad hoc queries and data analysis and enable separation of analysis workload from transaction workload. A data warehouse enables an organization to consolidate data from various sources.

Data warehouses often use denormalized or partially denormalized schemas (such as a star schema) to optimize query and analytical performance. A schema is a collection of database objects, including tables, views, indexes, and synonyms. A star schema is a simple and commonly used schema for storing data in a data warehouse. It is called a star schema because the entity-relationship diagram of this schema resembles a star, with points radiating from a central table. The center of the star comprises one or more fact tables and the points of the star are dimension tables associated with the fact tables. A typical fact table comprises fact measures and a set of keys (also referred to as foreign keys). The keys enable the fact table to be joined with its associated dimension tables for queries. Accordingly, the dimension tables associated with a fact table are related to the fact table through the foreign keys included in the fact table. For example, a fact table may be a SALES table having associated dimension tables TIME, PRODUCT, REGION, SALESPERSON, etc. The SALES fact table may store measures quantity_sold, amount, and cost, and store foreign keys time_ID, product_ID, region_ID, and salesperson_ID that enable the fact table to be joined with the dimension tables.

ETL processes may be used to extract, transform, and load data into a data warehouse based upon a star schema. As part of the process, the facts data may be extracted from one or more data sources and stored in a temporary fact-staging table. The records in the temporary fact-staging table may then be transformed and the transformed records may then be loaded into the fact table (the "final" fact table) in the data warehouse.

As part of the transformation process, foreign keys (or dimension table unique identifiers) for the dimension tables associated with a fact table that enable the fact table to be joined with the dimension tables need to be added to each of the records stored in the fact-staging table. This is typically done using a lookup transformation (such as the lookup transformation provided by Informatica and other ETL vendors) which is used to lookup values from a relational table/view or a flat file. During workflow execution, the lookup transformation creates a lookup cache (usually file-based) and loads into the cache all the records from a dimension table associated with the fact table. The lookup transformation then takes the records from the fact-staging table, matches them to data in the lookup cache, and determines foreign keys (unique identifiers) from the dimension table that are to be added to the fact-staging table records. Once this has been done for all the dimension tables associated with the fact tables, the fact-staging table records, now including foreign keys corresponding to the different dimension tables, are loaded into the final fact table in the data warehouse.

Due to the use of lookup transformations, in effect, each record from the fact-staging table has to pass through the lookup transformations for all the dimension tables prior to the records being loaded into the final fact table. Since there could be millions of fact records in the fact staging table, the use of the lookup transformation significantly impacts the ETL process. While the time needed for performing the transformations using the lookup transformations may be acceptable for narrow fact tables (i.e., fact tables associated with a small number of dimension tables, for example, 10 to 12 dimension tables), processing is adversely impacted for wider fact tables (i.e., fact tables associated with a large number of dimensions, for example, over 50 or 60 dimension tables). This is because each record from the fact-staging table is routed through a large number of lookup transformations corresponding to the large number of dimension tables. Further, since the lookup transformation does file system based searching of unique identifiers in the dimension tables, the process does not scale with a large number of dimensions. For example, transforming and loading wide fact tables can have a throughput as low as 266 RPS (rows per second). Loading one such fact table with 100 million records can take over 4 days to process.

The design and implementation of an ETL process is an important part of any Business Intelligence (BI) solution. The performance of an ETL process is one of the key factors that determine the success or failure of a BI implementation. Techniques are thus desired that improve the processing time needed for transforming and loading data into a data warehouse.

BRIEF SUMMARY OF THE INVENTION

Embodiments of the present invention provide techniques for transforming records prior to loading the records into a data warehouse in an efficient manner. In one embodiment, instead of using lookup transformations, a database operation such as an outer join operation is used to transform records stored in a fact staging table to add foreign keys to the records corresponding to the dimension tables that are associated with a fact table in a data warehouse to which the records are to be loaded. Since the outer join operation is memory intensive, a determination is made as to which dimension tables from the multiple dimension tables associated with the fact table are suitable, from a performance perspective, for the outer join operation. Only those suitable dimension tables are outer joined to the fact staging table to add the foreign keys for the outer joined dimension tables to the fact staging table records. Lookup transformations may be used to add foreign keys to the fact staging table records for the non-suitable dimension tables. The transformed fact records with the foreign keys may then be loaded into the fact table in the data warehouse.

According to an embodiment of the present invention, techniques are provided for facilitating transformation of a set of records. A plurality of dimension tables associated with a fact table in a data warehouse may be determined. A set of one or more dimension tables from the plurality of dimension tables are determined for which an outer join operation is to be used for adding foreign keys corresponding to the dimension tables to a plurality of records stored in a staging table prior to loading of the records in the fact table in the data warehouse. A query is provided for outer joining the dimension tables in the set of dimension tables to the staging table, wherein execution of the query causes, for each dimension table in the set of dimension tables, one or more foreign keys for the dimension table to be added to the records of the staging table.

In one embodiment, determining the set of dimension tables may comprise executing a query in which a first dimension table from the plurality of dimension tables is outer joined with the staging table. A determination is then made if the first dimension table belongs to the set of dimension tables based upon information determined from execution of the query. The first dimension table may be removed from the query and not included in the set of dimension tables if the information determined from execution of the query indicates that a memory is not sufficient to store a hash table for the records of all the dimension tables outer joined in the query.

In one embodiment, determining if the first dimension table belongs to the set of dimension tables comprises determining if the information determined from execution of the query indicates a wait event over the staging table. The first dimension table is removed from the query upon determining that the information determined from execution of the query indicates a wait event over the staging table. The query is updated by adding a second dimension table from the plurality of dimension tables to the query upon determining that the information determined from execution of the query does not indicate a wait event over the staging table, the second dimension table storing more records that the first dimension table, wherein the second dimension table is outer joined to the staging table.

In one embodiment, the provided query may be a SQL query. The query may be executed by an ETL tier during ETL operations.

According to an embodiment, the dimension tables in the plurality of dimension tables may be sorted to generate a sorted list, the dimension tables being sorted based upon a number of records stored by each dimension table in the plurality of dimension tables. A SQL query may be created. (i) A dimension table with the smallest number of records may be selected from the one or more dimension tables in the plurality of dimension tables that have not been added to the SQL query. (ii) The selected dimension table may be added to the SQL query such that the staging table is outer joined with the selected dimension table. (iii) The SQL query may then be executed. Steps (i), (ii), and (iii) may be repeated until information determined from execution of the SQL query indicates a wait event over the staging table. The SQL query with the last dimension table added to the SQL query removed from the SQL query may then be provided for transforming the records in a staging table.

In one embodiment, steps are taken to ensure that the outer join of the staging table and the selected dimension table is implemented using a HASH JOIN RIGHT OUTER operation.

According to an embodiment, one or more lookup transformations may be created for each dimension table in the plurality of dimension tables that is not included in the set of dimension tables, wherein a lookup transformation for a dimension table is usable for adding one or more foreign keys corresponding to the dimension table to the records in the staging table. The one or more lookup transformations may be used to add one or more foreign keys to the staging table records for the one or more dimension tables from the plurality of dimension tables not included in the set of dimension tables.

According to another embodiment of the present invention, techniques are provided for facilitating transformation of a set of records. For a first set of dimension tables from a plurality of dimension tables associated with a fact table, a query is provided for outer joining the dimension tables in the first set of dimension tables to a staging table, wherein execution of the query causes, for each dimension table in the first set of dimension tables, one or more foreign keys for the dimension table to be added to records of the staging table. For a second set of dimension tables comprising one or more dimension tables from the plurality of dimension tables associated with the fact table that are not included in the first set of dimension tables, one or more lookup transformations are provided, wherein the lookup transformations are usable for adding one or more foreign keys corresponding to the dimension tables in the second set of dimension tables to the records of the staging table.

In one embodiment, for at least one record in the staging table, the query is executed to add a first set of foreign keys corresponding to the first set of dimension tables to the at least one record, and a lookup transformation from the one or more lookup transformations is used to add a second set of foreign keys corresponding to the second set of dimension tables to the at least one record.

In on embodiment, a determination is made as to which one or more dimension tables from the plurality of dimension tables are included in the first set of dimension tables.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide techniques for transforming records prior to loading the records into a data warehouse in an efficient manner. In one embodiment, instead of using lookup transformations, a database operation such as an outer join operation is used to transform records stored in a fact staging table to add foreign keys to the records corresponding to the dimension tables that are associated with a fact table in a data warehouse to which the records are to be loaded. Since the outer join operation is memory intensive, a determination is made as to which dimension tables from the multiple dimension tables associated with the fact table are suitable, from a performance perspective, for the outer join operation. Only those suitable dimension tables are outer joined to the fact staging table to add foreign keys for the outer joined dimension tables to the fact staging table records. Lookup transformations may be used to add foreign keys to the fact staging table records for the non-suitable dimension tables. The transformed fact records with the foreign keys may then be loaded into the fact table in the data warehouse.

Figure 1:
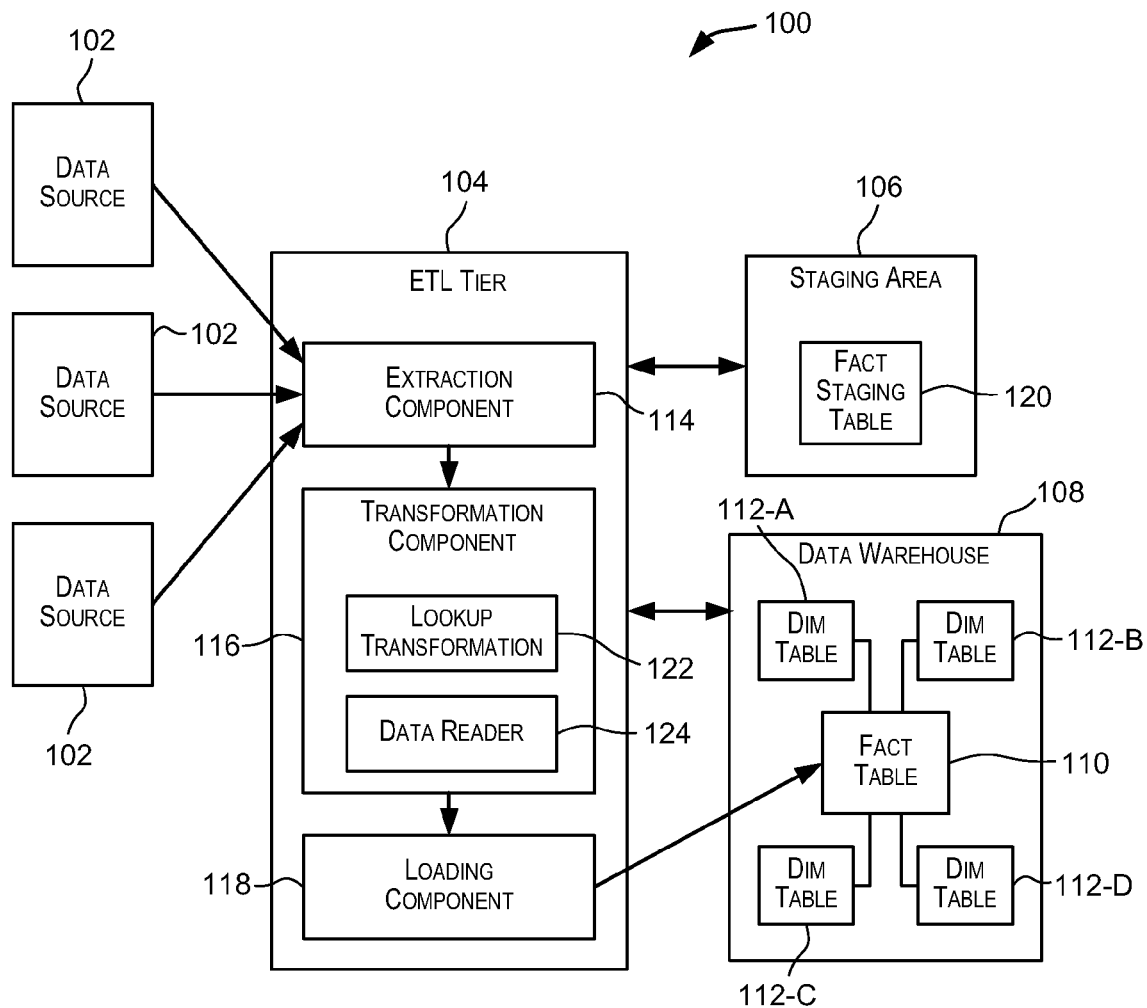
FIG. 1 depicts a simplified block diagram of a system that may incorporate an embodiment of the present invention.

FIG. 1 depicts a simplified block diagram of a system 100 that may incorporate an embodiment of the present invention. In the embodiment depicted in FIG. 1, system 100 comprises one or more data sources 102, an ETL tier 104, a staging area 106, and a target data warehouse 108. The components of system 100 depicted in FIG. 1 are meant for illustrative purposes only and are not intended to limit the scope of the invention in any manner. Alternative embodiments may have more or less components.

Data sources 102 may be databases, applications, flat files, and the like. A data source 102 may be an OLTP system. ETL tier 104 is configured to extract desired data from one or more data sources 102, perform transformations on the extracted data, and load the transformed data into data warehouse 108. ETL tier 104 may also perform other operations in addition to the extract, transform, and load operations.

Data warehouse 108 is designed for query and analysis rather than for transaction processing. Data warehouse 108 may store historical data derived from transaction data, and may also include data from other sources. Data warehouse 108 is designed to accommodate ad hoc queries and data analysis and enable separation of analysis workload from transaction workload. Data warehouse 108 enables an organization to consolidate data from various sources.

According to an embodiment of the present invention, data warehouse 108 stores data using a star schema. A schema is a collection of database objects, including tables, views, indexes, and synonyms. A star schema comprises one or more fact tables and dimension tables associated with the fact tables. Fact tables and dimension tables are two types of objects commonly used in dimensional data warehouse schemas such as a star schema. Fact tables are generally tables that store facts or measurements and foreign keys to the associated dimension tables. Dimension tables store data related to the data stored by the fact table and are commonly used to respond to queries.

In FIG. 1, data warehouse 108 comprises a fact table 110 and associated dimension tables 112-A, 112-B, 112-C, and 112-D. Fact table 110 may store fact measures and a set of keys (referred to as foreign keys or dimension table identifiers). A record of fact table 110 may store a foreign key for each of the dimension tables associated with fact table 110. The keys enable fact table 110 to be joined with associated dimension tables 112-A, 112-B, 112-C, or 112-D for queries. Accordingly, dimension tables 112-A, 112-B, 112-C, and 112-D are associated with and related to fact table 110 through foreign keys included in the records stored in fact table 110. For example, fact table 110 may be a SALES table having associated dimension tables TIME, PRODUCT, REGION, SALESPERSON, etc. The SALES fact table may store measures quantity_sold, amount, and cost, and store foreign keys time_ID, product_ID, region_ID, and salesperson_ID that enable the fact table to be joined with the dimension tables.

It the embodiment depicted in FIG. 1, ETL tier 104 comprises an extraction component 114, a transformation component 116, and a loading component 118. The components of ETL tier 104 depicted in FIG. 1 are not intended to limit the scope of the present invention as recited in the claims. Alternative embodiments of ETL tier 104 may have more or less components than those depicted in FIG. 1. The ETL tier components may be implemented in hardware, or software (code, program product, instructions executed by a processor), or combinations thereof.

Extraction component 114 is configured to extract desired data from one or more data sources 102. In one embodiment, extracted data to be stored in fact table 110 is extracted by extraction component 114 and stored in a fact staging table 120 in staging area 106. Fact staging table 120 is a temporary table for storing data prior to the data being transformed and loaded into fact table 110 in data warehouse 108. Fact staging table 120 may comprise a number of records (referred to as fact staging table records) storing data to be loaded into fact table 110 of data warehouse 108. Staging area 106 may be part of data warehouse 108 or may be separate from data warehouse 108 (as shown in FIG. 1). Extraction component 114 may also extract dimensions-related data from data sources 102 and store the data in dimension tables of data warehouse 108.

Transformation component 116 is configured to perform transformations on the extracted data. The type of transformations that are performed may depend upon the type of data that is extracted and also upon the schema used by data warehouse 108 for storing the data. As part of the transformation process, foreign keys that enable a fact table to be joined with its associated dimension tables are added to each of the fact staging table records prior to the records being stored in fact table 110. The number of foreign keys that are added to a record depends upon the number of dimension tables associated with the fact table and that are to be joined with the fact table. In one embodiment, a foreign key is added to a fact staging table record for each dimension table associated with fact table 110. In the embodiment depicted in FIG. 1, as part of the transformation process, foreign keys corresponding to the dimension tables 112-A, 112-B, 112-C, and 112-D associated with fact table 110 are added to the records stored in fact staging table 120.

Different techniques may be used for adding foreign keys to fact staging table records. One commonly used technique is the lookup transformation. As previously described, the lookup transformation creates a lookup cache (usually file-based) and loads into the cache all the records from a dimension table associated with the fact table. The lookup transformation then takes the records from the fact-staging table, matches each to information in the lookup cache, and determines foreign keys (unique identifiers) from the dimension table that are to be added to the fact-staging table record. This is done for all the records in fact staging table 120 for each dimension table associated with fact table 110. In the embodiment depicted in FIG. 1, transformation component 116 comprises a lookup transformation component 122 that performs record transformations using the lookup transformation operation. As previously describes, use of a lookup transformation for adding foreign keys to fact records can be very time consuming and inefficient especially in situations where there are a large number of fact records and the fact table has a large number of dimensions associated with it.

According to an embodiment of the present invention, transformation component 116 comprises a data reader component 124 that facilitates addition of foreign keys to the fact staging records without using a lookup transformation in a manner that improves the processing time needed for transforming and loading fact staging table records from fact staging table 120 to fact table 110 in data warehouse 108. This is done by using a database operation that is able to add foreign keys for one or more dimension tables to fact staging table records in a time that is faster than that needed for a lookup transformation. In one embodiment, instead of using the lookup transformation, foreign keys corresponding to one or more dimension tables are added to the fact staging table records by outer joining the one or more dimension tables associated with fact table 110 with fact staging table 120 using an outer join database operation. Using the outer join operation, fact staging table 120 is outer joined with the one or more dimension tables along with other columns from the fact staging table.

However, the performance benefits provided by an outer join operation may not be applicable for all dimension tables. This is because of the manner in which an outer join operation is executed. In an outer join operation, the records of a dimension table that is being outer joined to the fact staging table are stored in a hash table in memory for execution of the outer join operation. The amount of hash memory required for an outer join thus depends upon the number of records in the dimension table that is being outer joined. For a dimension table with a large number of records ("large dimension table"), there may be insufficient memory available to load all the records of the dimension table into hash memory and this may result in performance degradation of the outer join operation. Further, if multiple dimension tables are being outer joined in a query, the hash memory has to be large enough to store the contents for all the dimension tables that are outer joined with the fact staging table in the query. If the hash memory is not sufficient, then it can lead to performance degradation. In such a scenario, the performance gains achieved by using an outer join operation instead of a lookup transformation may be lost and it may better from a performance perspective to use a lookup transformation instead to add foreign keys corresponding to the large dimension table to the fact staging table records. Accordingly, whether or not an outer join operation provides for better performance than a lookup transformation for a dimension table depends upon the size of the dimension table which is usually measured by the number of records stored in the dimension table.

In order to avoid performance-related issues for large dimension tables, according to an embodiment of the present invention, the outer join is used to add foreign keys to fact staging table records only for small dimension tables while lookup transformations is used to add foreign keys to the fact staging table records for the remaining larger dimension tables. Whether a particular dimension table is suitable for an outer join operation or for a lookup transformation depends upon the available hash memory resources and the size of the dimension table and on the number of records stored by the other dimension tables that are being outer joined. One technique for determining which dimension tables are to be outer joined and for which dimension tables lookup transformations are to be used is discussed below with reference to FIG. 2.

In one embodiment, for dimension tables that are suitable for the outer join operation, an SQL query is created in which the dimension tables are each outer joined with the fact staging table. The SQL query is then provided to data reader 124 that sends the SQL query to data warehouse 108 for execution and fetches the records resulting from the query. Execution of the SQL query generates fact staging table records that include the foreign keys for the dimension tables that are outer joined. Data reader 124 then passes these transformed records to lookup transformation component 122 which uses lookup transformations to add foreign keys to the records for the remaining dimension tables (i.e., for dimension tables associated with fact table 110 that have not been outer joined to the fact staging table). The transformed fact staging table records, including keys inserted by an outer join or a lookup transformation, are then loaded into fact table 110.

In this manner, an outer join operation is executed for only those dimension tables that are determined to be suitable for the outer join. The dimension tables that are outer joined to the fact staging table may include all the dimension tables associated with the fact table or a subset of the dimension tables. Accordingly, only those dimension tables that would not degrade the performance of the transformation process are selected for the outer join operation. Lookup transformations are used for the other dimension tables. As a result, records from fact staging table 120 do not need to be fetched and routed through lookup transformations for each of the dimension tables. In this manner, the performance of the transformation process is maximized for a given set of memory resources and for the dimension tables involved.

An outer join operation is a join of two or more tables that returns all rows that satisfy the join condition and also returns some or all of those rows from one table for which no rows from the other satisfy the join condition. Two tables are referred to as being outer joined when an outer join operation is performed to join the two tables. Accordingly, the outer join operation does not require each record in two joined tables to have a matching record. The joined table retains each record, even if no matching record exists. In Structured Query Language (SQL), an outer join may be performed using a SQL OUTER JOIN clause which is a variation of the SQL JOIN clause and enables a SELECT statement to access the joined tables. The JOIN clause controls how the tables to be joined are linked. Outer joins come in various different flavors including a left outer join, a right outer join, and a full outer join, depending on which table's rows are retained (left, right, or both). For a table to qualify as "left" or "right", its name has to appear after the FROM or JOIN keyword, respectively.

The syntax and use of outer joins is known to those skilled in the art. A query that performs an outer join of tables A and B and returns all rows from A (a left outer join) may be written by using the LEFT [OUTER] JOIN syntax in the FROM clause, or by applying the outer join operator (+) to all columns of B in the join condition in the WHERE clause. For all rows in A that have no matching rows in B, the database operation returns null for any select list expressions containing columns of B. A query that performs an outer join of tables A and B and returns all rows from B (a right outer join) may be written by using the RIGHT [OUTER] JOIN syntax in the FROM clause, or by applying the outer join operator (+) to all columns of A in the join condition in the WHERE clause. For all rows in B that have no matching rows in A, the database operation returns null for any select list expressions containing columns of A. A query that performs an outer join and returns all rows from A and B, extended with nulls if they do not satisfy the join condition (a full outer join) may be written by using the FULL [OUTER] JOIN syntax in the FROM clause.

Various databases provide different techniques for executing outer join operations. For example, Oracle 10g database employs a very efficient method of executing outer joins using "HASH JOIN RIGHT OUTER" option. Using this execution plan, instead of choosing a large fact-staging table as a driving table and thus being scanned first, the dimension tables, which are usually smaller than the fact staging table, are scanned first and hashed into the memory. This reduces the processing time required for the outer join operation. Hash values are generated for each record from fact-staging table 120, probed into the hash table, and records are fetched with foreign keys added to the records as a result of the outer join operation.

Loading component 118 is configured to load the transformed records from fact staging table 120 to fact table 110. The loaded records may include foreign keys inserted using either an outer join operation and/or a lookup transformation.

Figure 2:
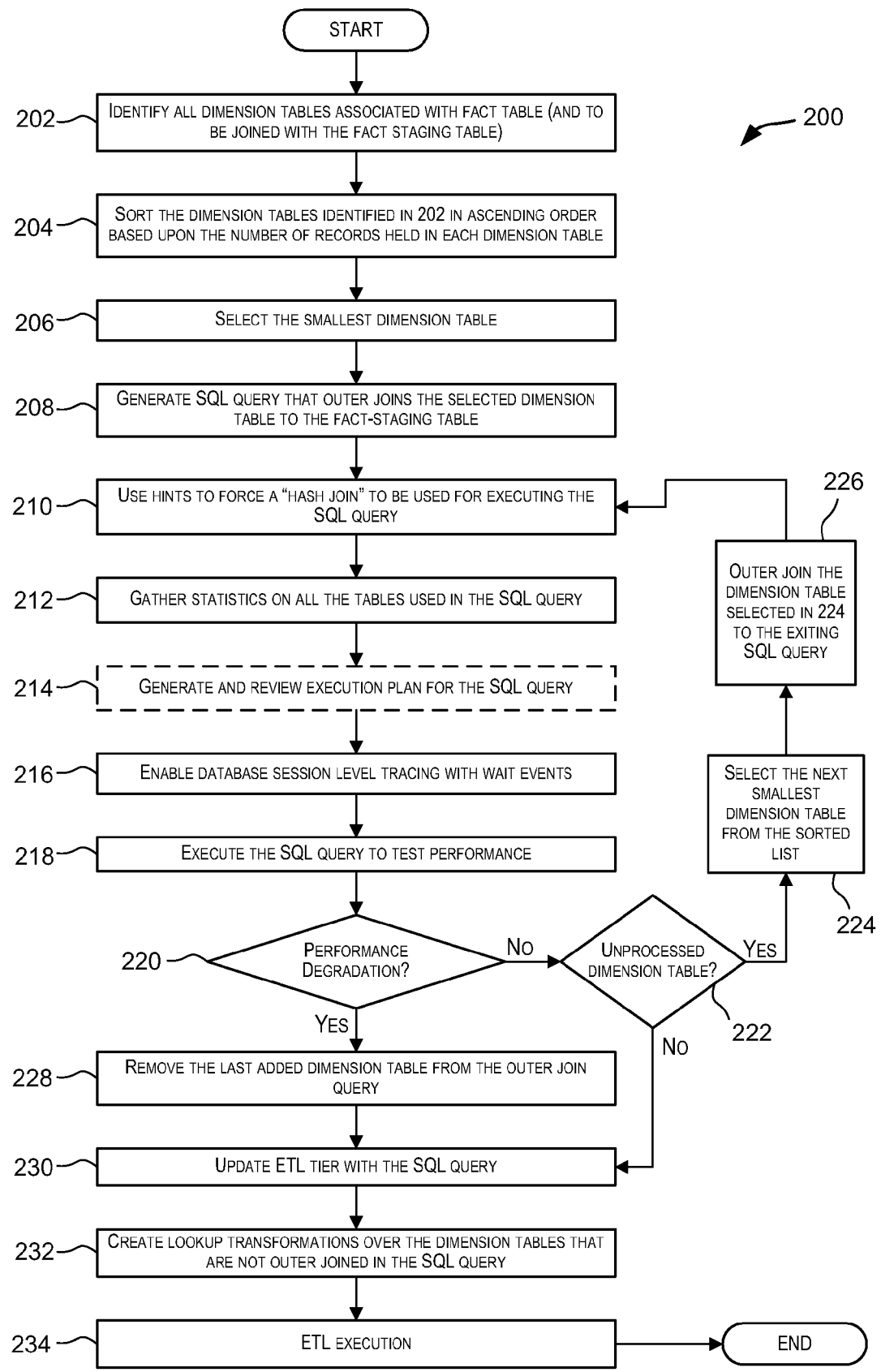
FIG. 2 is a simplified flowchart depicting a method of transforming and loading records into a fact table in a data warehouse according to an embodiment of the present invention.

FIG. 2 is a simplified flowchart 200 depicting a method of transforming and loading records into a fact table in a data warehouse according to an embodiment of the present invention. The method depicted in FIG. 2 and described below is illustrative of one embodiment and is not intended to limit the scope of embodiments of the present invention as recited in the claims. Other methods may be used in alternative embodiments.

As depicted in FIG. 2, dimension tables associated with fact table 110 and that are to be joined with fact staging table 120 are identified (step 202). The dimension tables identified in 202 are then sorted in ascending order based upon the number of records in each table (step 204). The smallest dimension table (i.e., the dimension table with the smallest number of records) from the sorted list is then selected (step 206). An SQL query is then created that outer joins the selected dimension table to fact staging table 120 and that fetches the dimension table unique identifier (foreign key) along with other columns from the fact-staging table (step 208).

Outer joins in different implementations may be performed using different techniques. For example, in an Oracle database such as 10g, an outer join may be performed using a hash join or a nested loop join. For performance purposes it is preferred that a hash join be used instead of a nested loop join. This is because in a hash join operation (such as a HASH JOIN RIGHT OUTER operation in Oracle 10g database), the smaller table (in our case the dimension table) is hashed first and then records from the larger table (in our case the fact staging table) are probed into the hash table. This provides significant performance benefits over other implementations wherein the larger table is hashed first and then probed with the smaller table. In order to force the database to use a hash join for the outer join, hints may be added to the SQL query to force a hash join (step 210). For example, in Oracle 10g database, a hint USE_HASH may be used in the SQL query to ensure that the dimension tables are joined with the fact staging table using a hash join.

Optimizer statistics are then computed for the tables used in the SQL query (step 212). Optimizer statistics are a collection of data gathered by the database optimizer that describe details about the database and the objects in the database. These statistics are used by the query optimizer to choose the best execution plan for each SQL statement. Statistics may include table statistics (e.g., number of rows, number of blocks, average row length), column statistics (e.g., number of distinct values (NDV) in column, number of nulls in column, data distribution (histogram)), index statistics (e.g., number of leaf blocks, levels, clustering factor), system statistics (e.g., I/O performance and utilization, CPU performance and utilization), and the like.

An execution plan for the SQL query may also be optionally generated (step 214). For example, an execution plan in an Oracle 10g database implementation may be generated. The execution plan provided a step by step analysis of how the SQL query will be executed. Gathering of the statistics and generation of the execution plan may be done to ensure and check that the database uses a hash join such as a "HASH JOIN RIGHT OUTER" option (or other optimal option) to execute the outer join wherein the smaller table (in our case the dimension table) is hashed first and then probed with records from the larger table (in our case the fact staging table). Such a hash join gives better performance for a large fact staging table to be outer joined to smaller dimension tables.

Database session level tracing is enabled with wait events (step 216). Tracing enables a user to view the progress of execution of a query. In one embodiment, when tracing is enabled, the information regarding the status of the SQL query execution is dumped to a trace file. A trace file helps a user to check the progress of an executed query. A trace file may log various wait events over the database objects indicating operations which are performed over database objects by the database engine. A database object may be identified by the obj# parameter in the trace file. This parameter maps to the object_id in the database. For example, a sample trace file may contain WAIT #4: nam='db file scattered read' ela=4574 file#=39 block#=892361 blocks=32 obj#=65303 tim=11388943776855

The following query may be executed on the database to check the table over which read operations are been performed:

Select object_name, object_type from all_objects where object_id=65303.

The SQL query is then executed to test the performance of the query (step 218). The query may be created and executed by an administrator of the ETL tier, a designer/developer of the data warehouse application, and the like. Execution of the SQL query outputs fact staging table records with foreign keys corresponding to the outer joined dimension table added to the records. While the SQL query is being executed, the trace file may be checked to see whether there are any indications of performance degradation (step 220). For example, for the execution of a SQL query comprising one or more outer joins with the dimension tables, the hash memory has to be sufficient to store a hash table for all the records of the dimension tables being outer joined in the SQL query. If the hash memory is not sufficient, then the hash table is partitioned, mapped, and dumped to disc. The probing table, i.e., the fact-staging table is also partitioned in a similar manner. Fact-staging table partitions are stored in temporary segments and are read and joined to the hash table. This is called a multi-pass hash join. Since the fact-staging table has to be partitioned to probe its records into the partitioned hash table, it is read in full, with partitions stored in temporary segments in database temporary files. In such a scenario, the reads over the fact-staging table are recorded continuously in the trace file as wait events "db file scattered read" followed by "direct path write" and "direct path read", which indicate reading of the table from datafile, followed by writing it to temporary segments, and then reading the same from temporary segments. If the hash table for the dimension tables being outer joined is fully contained in memory then records are directly fetched from the fact-staging table without any need for "db file scattered reads", "direct path write", or "direct path read" wait events.

Accordingly, presence of these wait events in the trace file indicates that the hash memory was not sufficient to store a hash table storing records of the one or more dimension tables being outer joined in the SQL query and may likely result in performance degradation. On the other hand, absence of these wait events from the trace file indicates that the hash memory was sufficient to store the hash table corresponding to the dimension tables being outer joined. A check is made in 220 whether, after scattered reads wait events are finished over the dimension tables, the query directly fetches the records from the fact-staging table without any long continuous "db file scattered reads", "direct path write", or "direct path read" waits over the fact-staging table. If the fact staging table records are fetched, the database will start logging the following wait events in the trace file, which indicates a good performance of query.

WAIT #2: nam='SQL*Net message to client' ela=0 driver id=1413697536 #bytes=1 p3=0 obj#=33444 tim=10062175409083

Obj#33444 corresponds to the object_id of the fact-staging table in the database.

If it is determined in 220 that the SQL query performance was not degraded, then processing continues with step 222 wherein a check is made to see if there are any more unprocessed dimension tables (i.e., a dimension table not outer joined with the fact staging table) in the dimension tables identified in 202 (step 222). If there is at least one unprocessed dimension table, then the next smallest unprocessed dimension table is selected for processing (step 224). The dimension table selected in 224 is then outer joined to the existing SQL query (step 226). In 226, the existing SQL query is modified to add an out join corresponding to the dimension table selected in 224. Processing then continues with 210 as described above. If it is determined in 222 that there are no more unprocessed dimension tables, then processing continues with step 230. In this manner, with each iterative loop, a new dimension table is outer joined to the fact staging table in the SQL query. This is continued until either all the dimension tables associated with the fact table are outer joined to the fact staging table or a determination is made that there is performance degradation (e.g., the available memory is not sufficient to store a hash table for records of all the dimension tables that are being outer joined).

Returning back to step 220, if it is determined in 220 that the query performance is degrading, then the last dimension table added to the query is removed from the outer join query (step 228). For example, if it is determined in 220 that the trace file comprises wait events "db file scattered reads", "direct path read", or "direct path write" over the fact-staging table, this indicates that the hash memory was not sufficient to store the hash table for the entire set of outer-joined tables including the last added dimension table and which leads to performance degradation. This indicates that the last added dimension table is not suitable from a performance perspective for an outer join operation and the last dimension table added to the query is removed. The removed dimension table is thus not included in the set of dimension tables that are suitable for outer joining with the fact staging table to add foreign keys corresponding to the dimension tables to the records of the fact staging table. No more dimension tables are added to the query since degradation due to the last added dimension table also implies that any dimension table that is larger (i.e., has more records) than the dimension table removed in 228 will also pose performance problems for the outer join query.

The ETL tier is then updated with the SQL query (step 230). In one embodiment, the SQL query is provided for use by the ETL tier. For example, data reader 124 in the ETL tier may be updated with the SQL query. By providing the query to the ETL tier, the SQL query is available for execution by the ETL tier for ETL operations. For example, the query may be executed by the ETL tire when ETL operations are performed. Lookup transformations may be created for the dimension tables that are not outer joined with the fact staging table in the SQL query (step 232). The lookup transformations may also be provided to the ETL tier.

ETL processes may then be executed (step 234). As part of the ETL execution, data reader 124 may send the SQL query to the data warehouse for execution and receive fact staging table resulting from execution of the SQL query. The fact staging table records resulting from the query execution include foreign keys corresponding to the dimension tables that are outer joined to the fact staging table in the SQL query. Data reader 124 may pass the resulting transformed fact staging table records to lookup transformation component 122, which uses lookup transformations created in 232 to add foreign keys to the records for the dimension tables identified in 202 and not included in the SQL query outer join. The transformed fact staging table records, including foreign keys corresponding to dimension tables inserted by an outer join or a lookup transformation, may then be loaded into fact table 110.

In the manner described above, the method described above attempts to use outer joins to add foreign keys to the fact staging table records for as many dimension tables as possible. A user, such as a developer, designer, ETL administrator, etc., may perform the steps in FIG. 2 to identify an optimal set of dimension tables comprising one or more dimension tables for which outer joins are used to add foreign keys corresponding to the dimension tables to the fact staging table records. By checking the performance of SQL query after each dimension table is added to the outer join query, it is ensured that outer joins are used only for those dimension tables that do not result in performance degradation. Further, by first sorting the dimension tables based upon the number of records in the dimension tables and iteratively outer joining dimension tables to the fact staging table starting with the smallest dimension table, optimizes the number of dimension tables that can be outer joined to the fact staging table without performance degradation. A SQL query outer joining the optimal set of dimension tables with the fact staging table is then provided to the ETL tier that executes the query tier when ETL operations are performed. In this manner, the need to use lookup transformations is avoided for as many dimension tables as possible. Lookup transformations are avoided for smaller dimension tables and created over larger dimensions that are more likely to lead to performance degradation for the outer join operation. Lookup transformations are used only for those dimension tables that are not outer joined.

Further, embodiments of the present invention may be adapted to different available memory resources. The iterative method of outer joining dimension tables to the fact staging table ensures that the SQL query for the outer joins is customized to available memory resources. This allows available memory resources to be utilized to their fullest extent in increasing the performance of the transformation operation.

In one implementation, on a system with 4 GB memory and database parameter PGA_AGGREGATE_TARGET (memory allocated for database PGA, which is used for storing hash table data) set to 1.1 GB, dimension tables with lesser than 1 million records were suitable for the outer join operation. In one of the test cases, a mapping that had over 48 lookup transformations on various dimension tables, was converted to a mapping with 34 smaller dimension tables outer joined to fact-staging table and created lookup transformations on rest of the 14 larger dimension tables. In this case, throughput improved from 266 records-per-second (RPS) to 1296 RPS (~5 times faster). Implementing star schema driven Data Warehouse for Business Intelligence Systems using Oracle 10g have demonstrated tremendous performance gains by harnessing improved execution plan for outer joins. Outer joining dimension tables to the fact-staging tables instead of lookup transformations have increased the ETL performance manifolds and drastically reduce the time taken to successfully finish ETL for volume databases.

The following is an example of how an outer join query may be generated according to an embodiment of the present invention. For purposes of this example, records are extracted and loaded into a fact staging table W_AR_XACT_FS. Foreign keys corresponding to the dimension tables are then added to the records, and the transformed records are then loaded into fact table W_AR_XACT_F.

For this example, the fact table is assumed to have 8 associated dimension tables whose foreign keys are to be inserted into the records in the fact staging table prior to the records being loaded into the fact table. According to the processing depicted in FIG. 2, the dimension tables are sorted based upon the number of records in the tables. Table A shown below depicts the dimension tables sorted in ascending order based upon the number of records (in thousands) in the tables.

TABLE A

| Sorted Dimension Tables | |
| --- | --- |
| Dimension table | No of records ('000) |
| W_ORG_D | 15 |
| W_SUPPLIER_D | 35 |
| W_SUPPLIER_ACCOUNT_D | 50 |
| W_PRODUCT_D | 115 |
| W_SALES_PRODUCT_D | 150 |
| W_INVENTORY_PRODUCT_D | 450 |
| W_GL_ACCOUNT_D | 2000 |
| W_CUSTOMER_LOC_D | 5000 |

After iteratively outer joining dimension tables with the fact staging table, starting with one with the smallest number of records according to the processing depicted in FIG. 2, it is determined that the first six tables are suitable for outer joins with the fact staging table while the last two tables are not suitable. Lookup transformations may be used to add foreign keys for the last two dimension tables. The final SQL query for joining the fact staging table W_AR_XACT_FS with the first six dimension tables is as follows:

```
SELECT /* USE_HASH(W_ORG_D
       W_SUPPLIER_D
       W_SUPPLIER_ACCOUNT_D
       W_PRODUCT_D
       W_SALES_PRODUCT_D
       W_INVENTORY_PRODUCT_D
       W_AR_XACT_FS) */
    W_ORG_D.ROW_WID,
       W_SUPPLIER_D.ROW_WID,
       W_SUPPLIER_ACCOUNT_D.ROW_WID,
       W_PRODUCT_D.ROW_WID,
       W_SALES_PRODUCT_D.ROW_WID,
       W_INVENTORY_PRODUCT_D.ROW_WID,
       W_AR_XACT_FS.GL_ACCOUNT_ID,
       W_AR_XACT_FS.GL_ACCOUNT_ID,
       W_AR_XACT_FS.BUDGT_ORG_ID,
       W_AR_XACT_FS.CUSTOMER_FIN_PROFL_ID1,
       W_AR_XACT_FS.CUSTOMER_FIN_PROFL_ID2,
       W_AR_XACT_FS.TERRITORY_ID,
       W_AR_XACT_FS.SALES_GROUP_ORG_ID,
       W_AR_XACT_FS.CUSTOMER_CONTACT_ID,
       W_AR_XACT_FS.CUSTOMER_SOLD_TO_LOC_ID,
       W_AR_XACT_FS.CUSTOMER_SHIP_TO_LOC_ID,
       W_AR_XACT_FS.CUSTOMER_BILL_TO_LOC_ID,
       W_AR_XACT_FS.CUSTOMER_PAYER_LOC_ID,
       W_AR_XACT_FS.SALES_REP_ID,
       W_AR_XACT_FS.SERVICE_REP_ID,
       W_AR_XACT_FS.ACCOUNT_REP_ID,
       W_AR_XACT_FS.PURCH_REP_ID,
       W_AR_XACT_FS.SUPPLIER_PRODUCT_ID,
       W_AR_XACT_FS.COMPANY_LOC_ID,
       W_AR_XACT_FS.PLANT_LOC_ID,
       W_AR_XACT_FS.AUX3_CHANGED_ON_DT,
       W_AR_XACT_FS.AUX4_CHANGED_ON_DT,
       W_AR_XACT_FS.DATASOURCE_NUM_ID,
       W_AR_XACT_FS.INTEGRATION_ID,
       W_AR_XACT_FS.TENANT_ID,
       W_AR_XACT_FS.X_CUSTOM
   FROM W_AR_XACT_FS
       LEFT OUTER JOIN W_ORG_D
           ON W_AR_XACT_FS.CUSTOMER_ID = W_ORG_D.INTEGRATION_ID
           AND W_AR_XACT_FS.DATASOURCE_NUM_ID = W_ORG_D.DATASOURCE_NUM_ID
           AND W_AR_XACT_FS.POSTED_ON_DT >= W_ORG_D.EFFECTIVE_FROM_DT
           AND W_AR_XACT_FS.POSTED_ON_DT < W_ORG_D.EFFECTIVE_TO_DT
```

-continued

```
    LEFT OUTER JOIN W_SUPPLIER_D
        ON W_AR_XACT_FS.SUPPLIER_ID = W_SUPPLIER_D.INTEGRATION_ID
            AND W_AR_XACT_FS.DATASOURCE_NUM_ID = W_SUPPLIER_D.DATASOURCE_NUM_ID
            AND W_AR_XACT_FS.POSTED_ON_DT >= W_SUPPLIER_D.EFFECTIVE_FROM_DT
            AND W_AR_XACT_FS.POSTED_ON_DT < W_SUPPLIER_D.EFFECTIVE_TO_DT
    LEFT OUTER JOIN W_SUPPLIER_ACCOUNT_D
        ON W_AR_XACT_FS.SUPPLIER_ACCOUNT_ID = W_SUPPLIER_ACCOUNT_D.INTEGRATION_ID
            AND W_AR_XACT_FS.DATASOURCE_NUM_ID = W_SUPPLIER_ACCOUNT_D.DATASOURCE_NUM_ID
            AND W_AR_XACT_FS.POSTED_ON_DT >= W_SUPPLIER_ACCOUNT_D.EFFECTIVE_FROM_DT
            AND W_AR_XACT_FS.POSTED_ON_DT < W_SUPPLIER_ACCOUNT_D.EFFECTIVE_TO_DT
    LEFT OUTER JOIN W_PRODUCT_D
        ON W_AR_XACT_FS.PRODUCT_ID = W_PRODUCT_D.INTEGRATION_ID
            AND W_AR_XACT_FS.DATASOURCE_NUM_ID = W_PRODUCT_D.DATASOURCE_NUM_ID
            AND W_AR_XACT_FS.POSTED_ON_DT >= W_PRODUCT_D.EFFECTIVE_FROM_DT
            AND W_AR_XACT_FS.POSTED_ON_DT < W_PRODUCT_D.EFFECTIVE_TO_DT
    LEFT OUTER JOIN W_SALES_PRODUCT_D
        ON W_AR_XACT_FS.SALES_PRODUCT_ID = W_SALES_PRODUCT_D.INTEGRATION_ID
            AND W_AR_XACT_FS.DATASOURCE_NUM_ID = W_SALES_PRODUCT_D.DATASOURCE_NUM_ID
            AND W_AR_XACT_FS.POSTED_ON_DT >= W_SALES_PRODUCT_D.EFFECTIVE_FROM_DT
            AND W_AR_XACT_FS.POSTED_ON_DT < W_SALES_PRODUCT_D.EFFECTIVE_TO_DT
    LEFT OUTER JOIN W_INVENTORY_PRODUCT_D
        ON W_AR_XACT_FS.INVENTORY_PRODUCT_ID = W_INVENTORY_PRODUCT_D.INTEGRATION_ID
            AND W_AR_XACT_FS.DATASOURCE_NUM_ID = W_INVENTORY_PRODUCT_D.DATASOURCE_NUM_ID
            AND W_AR_XACT_FS.POSTED_ON_DT >= W_INVENTORY_PRODUCT_D.EFFECTIVE_FROM_DT
            ANDW_AR_XACT_FS.POSTED_ON_DT < W_INVENTORY_PRODUCT_D.EFFECTIVE_TO_DT
```

As can be seen from the above query, the fact staging table W_AR_XACT_FS is outer joined (using LEFT OUTER JOIN) with six dimension tables, namely, W_ORG_D, W_SUPPLIER_D, W_SUPPLIER_ACCOUNT_D, W_PRODUCT_D, W_SALES_PRODUCT_D, and W_INVENTORY_PRODUCT_D.

The plan for the final query is shown below in Table B. As can be seen from Table B, a hash join is used to implement the outer joins.

TABLE B

Execution Plan

| Id | Operation | Name | Rows | Bytes | TempSpc | Cost (% CPU) | Time |
|---|---|---|---|---|---|---|---|
| 0 | SELECT STATEMENT | | 15M | 11G | | 2410K (1) | 09:22:24 |
| * 1 | HASH JOIN RIGHT OUTER | | 15M | 11G | | 2410K (1) | 09:22:24 |
| 2 | TABLE ACCESS FULL | W_PRODUCT_D | 10020 | 420K | | 81 (3) | 00:00:02 |
| * 3 | HASH JOIN RIGHT OUTER | | 15M | 11G | 127M | 2410K (1) | 09:22:21 |
| 4 | TABLE ACCESS FULL | W_INVENTORY_PRODUCT_D | 2618K | 97M | | 13724 (2) | 00:03:13 |
| * 5 | HASH JOIN RIGHT OUTER | | 15M | 10G | 127M | 1920K (1) | 07:28:06 |
| 6 | TABLE ACCESS FULL | W_SALES_PRODUCT_D | 2617K | 97M | | 11408 (2) | 00:02:40 |
| * 7 | HASH JOIN RIGHT OUTER | | 15M | 10G | 23M | 1456K (1) | 05:39:56 |
| 8 | TABLE ACCESS FULL | W_SUPPLIER_ACCOUNT_D | 493K | 17M | | 2187 (2) | 00:00:31 |
| * 9 | HASH JOIN RIGHT OUTER | | 15M | 9757M | 23M | 1029K (1) | 04:00:14 |
| 10 | TABLE ACCESS FULL | W_SUPPLIER_D | 493K | 17M | | 2700 (2) | 00:00:38 |
| * 11 | HASH JOIN RIGHT OUTER | | 15M | 9227M | 76M | 624K (1) | 02:25:41 |
| 12 | TABLE ACCESS FULL | W_ORG_D | 1715K | 57M | | 24909 (3) | 00:05:49 |
| 13 | TABLE ACCESS FULL | W_AR_XACT_FS | 15M | 8727M | | 216K (2) | 00:50:25 |

Figure 3:
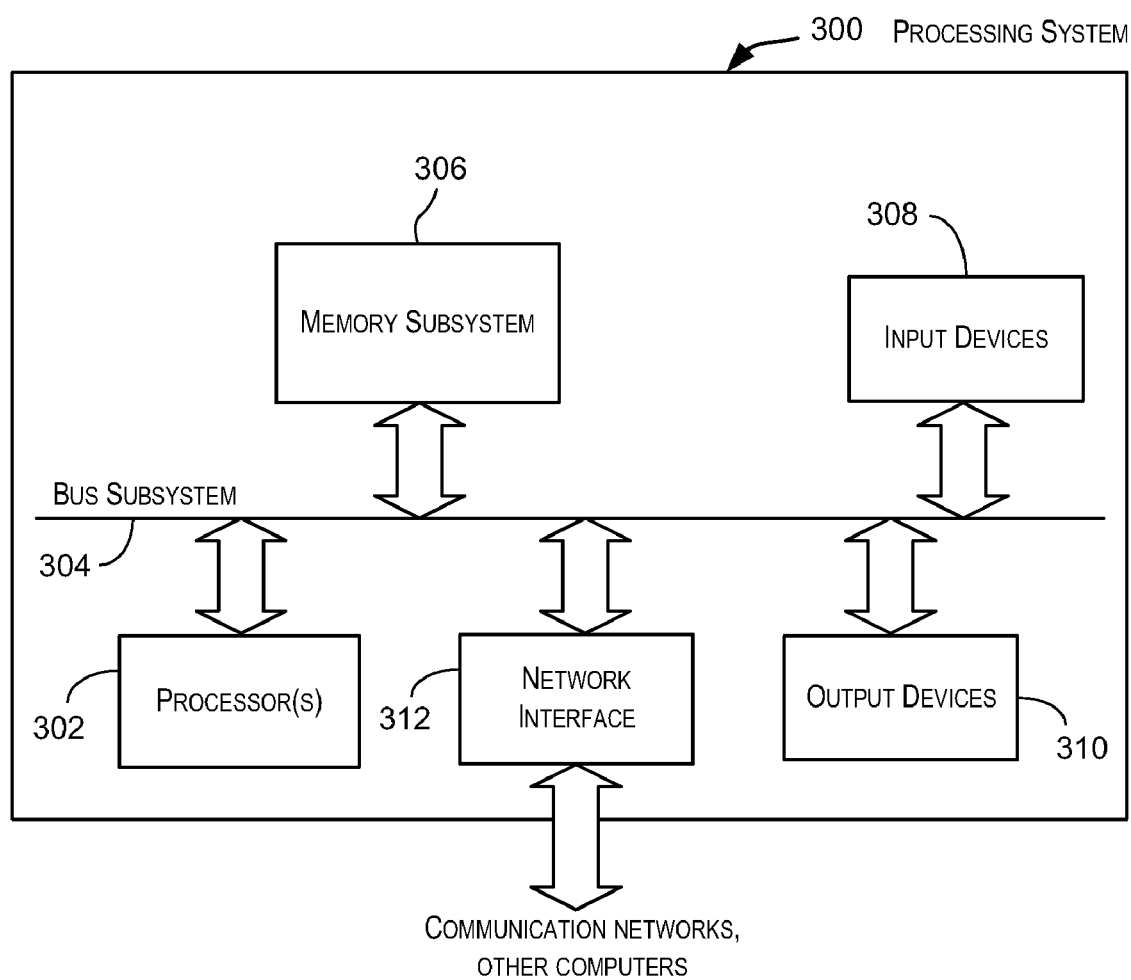
FIG. 3 is a simplified block diagram of a processing system that may be used to practice an embodiment of the present invention.

FIG. 3 is a simplified block diagram of a processing system 300 that may be used to practice an embodiment of the present invention. System 300 may be part of an ETL tier or may also be part of a data warehouse system and may be used to execute SQL queries and lookup transformations. As shown in FIG. 3, system 300 includes a processor 302 that communicates with a number of peripheral devices via a bus subsystem 304. These peripheral devices may include a memory subsystem 306, input devices 308, output devices 310, and a network interface subsystem 312. Bus subsystem 304 provides a mechanism for letting the various components and subsystems of system 300 communicate with each other as intended. Although bus subsystem 304 is shown schematically as a single bus, alternative embodiments of the bus subsystem may utilize multiple busses.

Processor 302 is configured to perform processing performed by system 300. For example, processor 302 may be configured to execute programs, code, or instructions to perform transformation and load operations according to an embodiment of the present invention. Processor 302 may also control other subsystems or devices.

Input devices 308 enable a user such as a data warehouse administrator or an ETL process operator to interact with and provide information to system 300. Input devices 308 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 300. Input devices 308 typically allow a user to select objects, icons, text and the like that appear on a monitor via a command such as a click of a button or the like.

Output devices 310 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 300. For example, the trace files may be viewed by a user using an output device.

Network interface subsystem 312 provides an interface to other computer systems, and networks. Network interface subsystem 312 serves as an interface for receiving data from other sources and for transmitting data to other sources from system 300. Embodiments of network interface subsystem 312 include an Ethernet card, a modem (telephone, satellite, cable, ISDN, etc.), (asynchronous) digital subscriber line (DSL) units, FireWire interface, USB interface, and the like. For example, subsystem 312 may be coupled to a computer network, to a FireWire bus, or the like. In other embodiments, network interface subsystem 312 may be physically integrated on the motherboard of system 300, and may be a software program, such as soft DSL, or the like.

Memory subsystem 306 may be configured to store the basic programming and data constructs that provide the functionality of the present invention. For example, a computer program or software code modules (or instructions) implementing the functionality of the present invention may be stored in memory 306. These software modules may be executed by processor(s) 302. Memory 306 may also provide a repository for storing data used in accordance with the present invention. For example, memory 306 may store a fact staging table and or a data warehouse.

Memory 306 may include a number of memories including a main random access memory (RAM) for storage of instructions and data during program execution and a read only memory (ROM) in which fixed instructions are stored. RAM is generally semiconductor-based memory that can be read and written by processor 302. The storage locations can be accessed in any order. RAM is generally understood to refer to volatile memory that can be written to as well as read. For example, the hash tables used for the outer join operation corresponding to data from a dimension table may be stored in a RAM. There are various different types of RAM.

Memory 306 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 300 can be of various types including a personal computer, a portable computer, a workstation, a network computer, a mainframe, a kiosk, or any other data processing system. Due to the ever-changing nature of computers and networks, the description of system 300 depicted in FIG. 3 is intended only as a specific example for purposes of illustrating the preferred embodiment of a processing system. Many other configurations having more or fewer components than the system depicted in FIG. 3 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc., and the like. Further, use of different types of operating systems is contemplated, such as Windows®, WindowsXP®, WindowsNT®, or the like from Microsoft Corporation, Solaris from Sun Microsystems, LINUX, UNIX, and the like.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention has been described using a particular series of transactions and steps, it should be apparent to those skilled in the art that the scope of the present invention is not limited to the described series of transactions and steps.

Further, while embodiments of the present invention has been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of facilitating transformation of a set of records, the method comprising:
determining, by a computer system, a plurality of dimension tables associated with a fact table in a data warehouse;
determining, by the computer system, a set of one or more dimension tables from the plurality of dimension tables for which an outer join operation is to be used for adding foreign keys corresponding to the dimension tables to a plurality of records stored in a staging table prior to loading of the records in the fact table in the data warehouse,
wherein determining the set of dimension tables comprises:
executing, by the computer system, a query in which a first dimension table from the plurality of dimension tables is outer joined with the staging table, and
determining, by the computer system, if the first dimension table belongs to the set of dimension tables based upon information determined from execution of the query,
wherein the information comprises an indication of whether at least a portion of the staging table was written to disk in response to execution of the query;
providing, by the computer system, a query for outer joining the dimension tables in the set of dimension tables to the staging table, wherein execution of the query causes, for each dimension table in the set of dimension tables, one or more foreign keys for the dimension table to be added to the records of the staging table; and
creating, by the computer system, one or more lookup transformations for each dimension table in the plurality of dimension tables that is not included in the set of dimension tables, wherein a lookup transformation for a dimension table is usable for adding one or more foreign keys corresponding to the dimension table to the records in the staging table.

2. The method of claim 1 wherein determining the set of dimension tables further comprises:
removing, by the computer system, the first dimension table from the query and not including the first dimension table in the set of dimension tables if the information determined from execution of the query indicates that a memory is not sufficient to store a hash table for the records of all the dimension tables outer joined in the query.

3. The method of claim 1 wherein determining if the first dimension table belongs to the set of dimension tables comprises:
   determining, by the computer system, if the information determined from execution of the query indicates a wait event over the staging table; and
   removing, by the computer system, the first dimension table from the query upon determining that the information determined from execution of the query indicates a wait event over the staging table; and
   updating, by the computer system, the query by adding a second dimension table from the plurality of dimension tables to the query upon determining that the information determined from execution of the query does not indicate a wait event over the staging table, the second dimension table storing more records that the first dimension table, wherein the second dimension table is outer joined to the staging table.

4. The method of claim 1 further comprising executing the query.

5. The method of claim 1 wherein the provided query is a SQL query.

6. The method of claim 1 further comprising:
   sorting, by the computer system, the dimension tables in the plurality of dimension tables to generate a sorted list, the dimension tables sorted based upon a number of records stored by each dimension table in the plurality of dimension tables;
   creating, by the computer system, a SQL query;
   (i) from the one or more dimension tables in the plurality of dimension tables that have not been added to the SQL query, selecting, by the computer system, a dimension table with the smallest number of records,
   (ii) adding, by the computer system, the selected dimension table to the SQL query such that the staging table is outer joined with the selected dimension table;
   (iii) executing, by the computer system, the SQL query;
   repeating, by the computer system, (i), (ii), and (iii) until information determined from execution of the SQL query indicates a wait event over the staging table;
   wherein the providing comprises providing the SQL query with the last dimension table added to the SQL query removed from the SQL query.

7. The method of claim 6 wherein the adding comprises ensuring that the outer join of the staging table and the selected dimension table is implemented using a HASH JOIN RIGHT OUTER operation.

8. The method of claim 1 further comprising:
   using, by the computer system, the one or more lookup transformations to add one or more foreign keys to the staging table records for the one or more dimension tables from the plurality of dimension tables not included in the set of dimension tables.

9. A method of facilitating transformation of a set of records, the method comprising:
   determining, by a computer system, which one or more dimension tables from a plurality of dimension tables are included in a first set of dimension tables;
   wherein determining comprises:
   executing, by the computer system, a query in which a first dimension table from the plurality of dimension tables is outer joined with a staging table, and
   determining, by the computer system, if the first dimension table belongs to the first set of dimension tables based upon information determined from execution of the query,
   wherein the information comprises an indication of whether at least a portion of the staging table was written to disk in response to execution of the query; and
   for the first set of dimension tables from the plurality of dimension tables associated with a fact table, providing, by the computer system, a query for outer joining the dimension tables in the first set of dimension tables to the staging table, wherein execution of the query causes, for each dimension table in the first set of dimension tables, one or more foreign keys for the dimension table to be added to records of the staging table; and
   for a second set of dimension tables comprising one or more dimension tables from the plurality of dimension tables associated with the fact table that are not included in the first set of dimension tables, providing, by the computer system, one or more lookup transformations, wherein the lookup transformations are usable for adding one or more foreign keys corresponding to the dimension tables in the second set of dimension tables to the records of the staging table; and
   creating, by the computer system, one or more lookup transformations for each dimension table in the plurality of dimension tables associated with the fact table that is not included in the first set of dimension tables, wherein a lookup transformation for a dimension table is usable for adding one or more foreign keys corresponding to the dimension table to the records in the staging table.

10. The method of claim 9 further comprising:
    for at least one record in the staging table,
       executing, by the computer system, the query to add a first set of foreign keys corresponding to the first set of dimension tables to the at least one record, and
       using, by the computer system, a lookup transformation from the one or more lookup transformations to add a second set of foreign keys corresponding to the second set of dimension tables to the at least one record.

11. The method of claim 1, wherein the first dimension table belongs to the set of dimension tables when the information determined from execution of the query indicates that memory is sufficient to store a hash table for the records of the dimension tables outer joined in the query.

12. The method of claim 11, wherein the information determined from execution of the query indicates that a memory is sufficient to store a hash table when a trace file generated by the query does not include a wait event associated with the staging table.

13. The method of claim 12, wherein the wait event comprises a database file scattered read, a direct path read, a direct path write, or a combination thereof, over the staging table.

14. A system for facilitating transformation of a set of records, the system comprising:
    a processor configured to:
    determine a plurality of dimension tables associated with a fact table in a data warehouse;
    determine a set of one or more dimension tables from the plurality of dimension tables for which an outer join operation is to be used for adding foreign keys corresponding to the dimension tables to a plurality of records stored in a staging table prior to loading of the records in the fact table in the data warehouse,
    wherein to determine the set of dimension tables, the processor is configured to:
    execute a query in which a first dimension table from the plurality of dimension tables is outer joined with the staging table, and determine if the first dimension table belongs to the set of dimension tables based upon information determined from execution of the query, wherein to determine if the first dimension table belongs to the set of dimension tables, the processor is configured to determine if the information determined from execution of the query indicates a wait event over the staging table;

provide a query for outer joining the dimension tables in the set of dimension tables to the staging table, wherein execution of the query causes, for each dimension table in the set of dimension tables, one or more foreign keys for the dimension table to be added to the records of the staging table; and create one or more lookup transformations for each dimension table in the plurality of dimension tables that is not included in the set of dimension tables, wherein a lookup transformation for a dimension table is usable for adding one or more foreign keys corresponding to the dimension table to the records in the staging table.

15. The system of claim 14 wherein to determine the set of dimension tables the processor is further configured to:

remove the first dimension table from the query and not include the first dimension table in the set of dimension tables if the information determined from execution of the query indicates that a memory is not sufficient to store a hash table for the records of all the dimension tables outer joined in the query.

16. The system of claim 14 wherein to determine if the first dimension table belongs to the set of dimension tables the processor is further configured to:

remove the first dimension table from the query upon determining that the information determined from execution of the query indicates a wait event over the staging table; and update the query by adding a second dimension table from the plurality of dimension tables to the query upon determining that the information determined from execution of the query does not indicate a wait event over the staging table, the second dimension table storing more records that the first dimension table, wherein the second dimension table is outer joined to the staging table.

17. The system of claim 14 wherein the processor is further configured to execute the query.

18. The system of claim 14 wherein the processor is further configured to:

sort the dimension tables in the plurality of dimension tables to generate a sorted list, the dimension tables sorted based upon a number of records stored by each dimension table in the plurality of dimension tables;

create a SQL query;

(i) from the one or more dimension tables in the plurality of dimension tables that have not been added to the SQL query, select a dimension table with the smallest number of records, (ii) add the selected dimension table to the SQL query such that the staging table is outer joined with the selected dimension table;

(iii) execute the SQL query;

repeat (i), (ii), and (iii) until information determined from execution of the SQL query indicates a wait event over the staging table;

wherein to provide the query the processor is further configured to remove from the SQL query the last dimension table added.

* * * * *

UNITED STATES PATENT AND TRADEMARK OFFICE
CERTIFICATE OF CORRECTION

PATENT NO. : 8,352,458 B2  
APPLICATION NO. : 12/116693  
DATED : January 8, 2013  
INVENTOR(S) : Aggarwal Page 1 of 1

It is certified that error appears in the above-identified patent and that said Letters Patent is hereby corrected as shown below:

In column 6, line 10, delete "It" and insert -- In --, therefor.

In column 17, line 27, delete "and or" and insert -- and/or --, therefor.

Signed and Sealed this
Second Day of April, 2013

Teresa Stanek Rea
*Acting Director of the United States Patent and Trademark Office*